United States Patent [19]

Tanaka et al.

[11] Patent Number: 5,764,236
[45] Date of Patent: Jun. 9, 1998

[54] IMAGE DATA PROCESSING APPARATUS AND IMAGE REPRODUCTION APPARATUS

[75] Inventors: Koichiro Tanaka, Tokyo; Akihiro Katayama, Yokosuka; Eita Ono, Tokyo; Shinya Urisaka, Kashiwa, all of Japan

[73] Assignee: Canon Kabushiki Kaisha, Tokyo, Japan

[21] Appl. No.: 540,870

[22] Filed: Oct. 11, 1995

[30] Foreign Application Priority Data

Oct. 13, 1994 [JP] Japan .................................. 6-247759

[51] Int. Cl.⁶ ........................................................ G09B 9/08
[52] U.S. Cl. ................................................ 345/429; 345/425
[58] Field of Search ............................ 395/129, 118, 395/119, 125; 348/59, 42; 345/429, 418, 419, 425

[56] References Cited

U.S. PATENT DOCUMENTS

| | | | |
|---|---|---|---|
| 4,654,872 | 3/1987 | Hisano et al. | 382/154 |
| 4,807,158 | 2/1989 | Blanton et al. | 395/125 |
| 4,987,487 | 1/1991 | Ichinose et al. | 348/59 |
| 5,325,472 | 6/1994 | Horiuchi et al. | 395/127 |
| 5,430,474 | 7/1995 | Hines | 348/42 |

FOREIGN PATENT DOCUMENTS 2244621  12/1991  United Kingdom.

OTHER PUBLICATIONS

European Search Report in corresponding foreign application EP95 30 7235.

*Primary Examiner*—Phu K. Nguyen
*Assistant Examiner*—Cliff N. Vo
*Attorney, Agent, or Firm*—Morgan & Finnegan, LLP

[57] ABSTRACT

The present invention relates to an image data processing apparatus for generating an image corresponding to a view point, which is constituted by multi view points image data hold means for holding a plurality of image data having mutually different positions as view points, corresponding point trace detection means for sequentially detecting a coefficient which defines a trace of mutually corresponding points among the multi view points image data and member for outputting the coefficient of each of a plurality of the corresponding point traces present in the multi view points image data.

10 Claims, 4 Drawing Sheets

IMAGE DATA PROCESSING APPARATUS AND IMAGE REPRODUCTION APPARATUS

BACKGROUND OF THE INVENTION

1. Field of the Invention

The present invention relates to an image data processing apparatus and an image reproduction apparatus which are used when a plurality of images corresponding to different view points are inputted and an image having a view point position corresponding to the current eye position of an observer with respect to a display device is outputted.

2. Related Background Art

Conventional apparatuses for stereoscopically displaying images viewed from a plurality of view points include a stereoscopic display, a lenticular display, and the like. The stereoscopic display displays images obtained from two cameras while alternately switching the images at high speed. An observer can stereoscopically observe an image by using shutter spectacles or polarization spectacles which are synchronized with the switching timing of the images. The lenticular display can stereoscopically express images at, e.g., four view points by rearranging images from four cameras in units of pixels and adhering a lenticular sheet to the front surface.

However, the above-mentioned conventional stereoscopic display allows observation of only a stereoscopic image in the phototaking directions of the cameras upon phototaking of images.

More specifically, since an object is phototaken by two cameras fixed in position, the image to be observed does not change even when the observer moves his or her view point (eye position), and view point movement at the observer side is not reflected in the image to be observed, resulting in poor ambience. On the other hand, the lenticular display can cope with movement, in the right-and-left direction of the view point of an observer, but cannot cope with continuous view point movement since the observer observes images obtained from different cameras at intervals. In addition, the view point cannot move in the back-and-forth direction. As for view point movement in the back-and-forth direction, a stereoscopic view is attained based on computer graphics images. However, such a stereoscopic view is attained only under a special condition that images are simple, and all the coordinate values in a three-dimensional space corresponding to points in images are known. In stereoscopic display of images phototaken by cameras, almost no examination has been made yet as to view point movement in the back-and-forth direction.

SUMMARY OF THE INVENTION

The present invention has been made in consideration of the conventional problems, and has as its object to provide an image processing method and apparatus, which can present an image as viewed from a position to which the eye position of an observer has moved when the eye position moves in each of directions including the back-and-forth direction.

According to one aspect of the present invention, an image data processing apparatus for generating an image corresponding to a view point, comprises: multi view points image data hold means for holding a plurality of image data respectively having different positions as view points; corresponding point trace detection means for sequentially detecting a coefficient which defines a trace of mutually corresponding points among the multi view points image data; and means for outputting the coefficient of each of a plurality of the corresponding point traces present in the multi view points image data.

According to a preferred aspect, the corresponding point trace detection means comprises means for detecting a coefficient which defines a straight line as the corresponding point trace on an epipolar plane image of the multi view points image data.

According to another preferred aspect, the corresponding point trace detection means comprises means for detecting a coefficient which defines a plane as the mutually corresponding point trace among the multi view points image data.

According to another aspect of the present invention, an image reproduction apparatus for reproducing an image in correspondence with a view point, comprises: coefficient input means for inputting a coefficient which defines a trace of mutually corresponding points among multi view points image data; means for inputting a view point position; image interpolation generation means for generating an image corresponding to the inputted view point position by interpolation on the basis of the coefficient of the corresponding point trace; and means for outputting the generated image to a display device.

According to a preferred aspect, the coefficient of the corresponding point trace is a coefficient which defines a straight line as the corresponding point trace on an epipolar plane image of the multi view points image data.

According to another preferred aspect, the coefficient of the corresponding point trace is a coefficient which defines a plane as the mutually corresponding point trace among the multi view points image data.

According to a preferred aspect, the image reproduction apparatus further comprises view point position detection means for detecting a position of an eye of an observer who observes the display device, and the view point position from the view point position detection means is inputted to the view point position input means. Also, the apparatus further comprises distortion correction means for correcting a distortion of the image generated by the image interpolation generation means.

According to a preferred aspect, the display device comprises a stereoscopic display.

According to another preferred aspect, the display device comprises a lenticular display.

Some embodiments of a display device according to the present invention will be described in detail later.

DETAILED DESCRIPTION OF THE PREFERRED EMBODIMENTS (First Embodiment)

Figure 1:
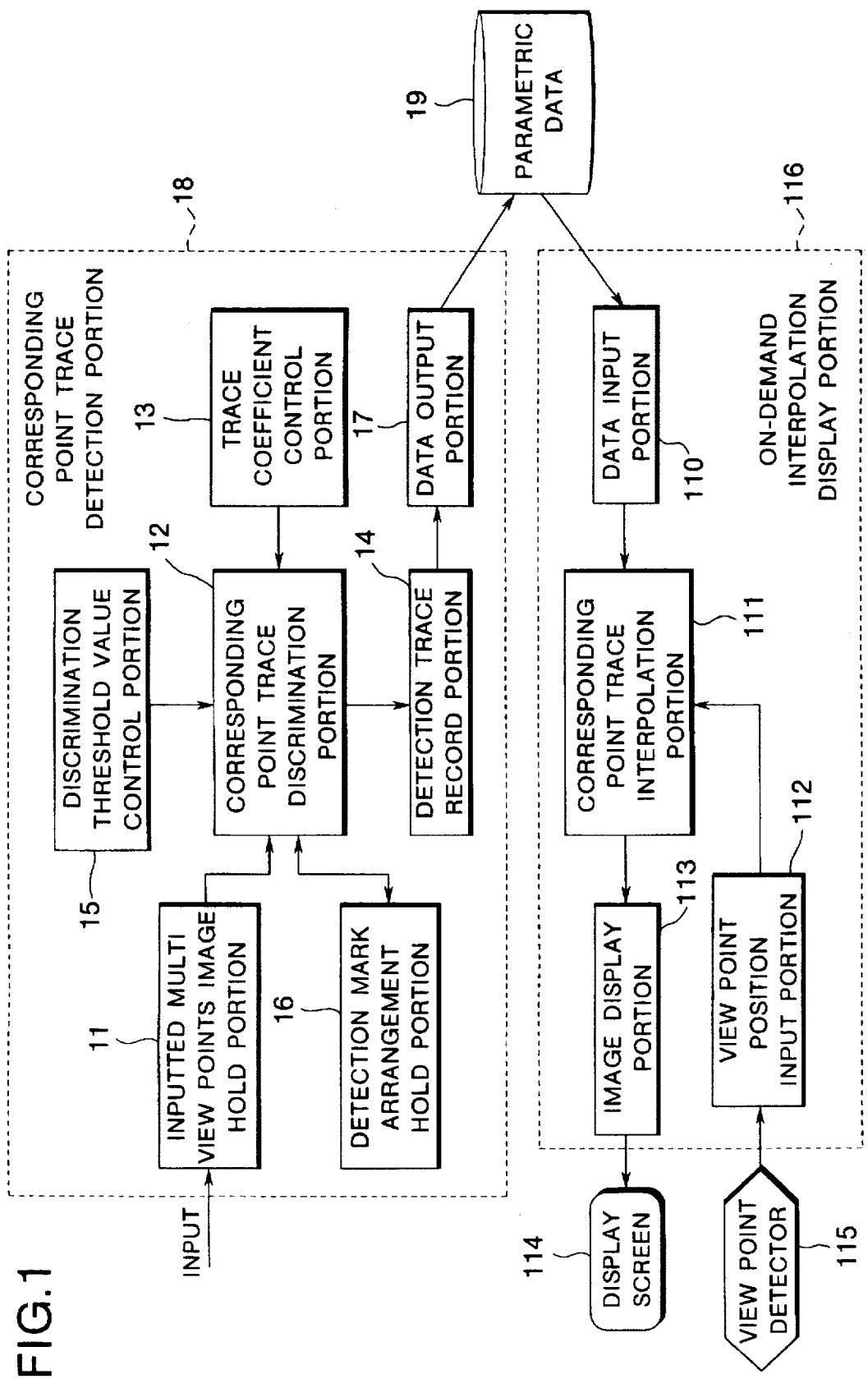
FIG. 1 is a block diagram showing the arrangement of an image processing apparatus according to the first embodiment of the present invention.

FIG. 1 is a block diagram showing the arrangement of an image processing apparatus of the first embodiment. Referring to FIG. 1, an inputted multi view points image hold portion 11 holds images obtained by phototaking an object from a large number of view points aligned on a line in the right-and-left direction. A corresponding point trace discrimination portion 12 discriminates whether or not an existing linear corresponding point trace is obtained when multi view points images of the inputted multi view points image hold portion 11 are rearranged in the order of view points. A trace coefficient control portion 13 sequentially assumes and calculates a temporary trace coefficient so as to search for the coefficient of the corresponding point trace detected by the corresponding point trace discrimination portion 12. A detection trace record portion 14 records the trace coefficient detected by the corresponding point trace discrimination portion 12 and the density value of the trace. A discrimination threshold value control portion 15 controls a threshold value serving as a discrimination criterion upon searching of the corresponding point trace discrimination by the corresponding point trace discrimination portion 12. A detection mark arrangement hold portion 16 holds additional information corresponding to occlusion of the corresponding point trace detected by the corresponding point trace discrimination portion 12. A data output portion 17 outputs the corresponding trace coefficient and density value recorded in the detection trace record portion 14. A corresponding point trace detection portion 18 is constituted by the above-mentioned portions (11 to 17).

Parametric data 19 as the corresponding point trace coefficients output from the data output portion 17 is recorded in a record area of the apparatus or in a portable magnetic recording medium or optical recording medium. The parametric data 19 includes a sufficient number of corresponding trace coefficients of an object required for attaining a display at an arbitrary view point, but their data amount is very small as compared to a case wherein all images corresponding to possible view point movements are held. For this reason, a memory capacity required for the apparatus can be reduced.

A data input portion 110 inputs the recorded parametric data 19. Of course, the data output portion 17 may directly input the parametric data 19 via communications. A corresponding point trace interpolation portion 111 interpolates the mutually corresponding point trace among the data input portion 110 on the basis of the view point position so as to generate an image viewed from the view point. A view point position input portion 112 receives the view point position from a view point detector 115. An image display portion 113 displays an image on a display screen 114. The display screen 114 for displaying an image is fixed in position. The view point detector 115 detects the eye position of a user who observes the display screen 114. An on-demand interpolation display portion 116 is constituted by the above-mentioned portions (110 to 113). In the on-demand interpolation display portion 116, the data input portion 110 receives the parametric data 19 and supplies it to the corresponding point trace interpolation portion 111. When the user who observes the display screen 114 changes his or her head position to move his or her view point, the signal corresponding to the view point position from the view point detector 115 changes. The view point position input portion 112 receives the change in view point position, and supplies the new view point position to the corresponding point trace interpolation portion 111. Upon reception of the view point position, the corresponding point trace interpolation portion 111 generates a new image corresponding to the view point movement, and supplies the generated image to the image display portion 113. The image display portion 113 displays an image corresponding to the change in view point position of the user on the display screen 114. The view point position inputted to the view point position input portion 112 is not limited to a signal from the view point detector 115. For example, the user may arbitrarily change the view point position signal using view point position moving means such as a joystick.

Figure 2:
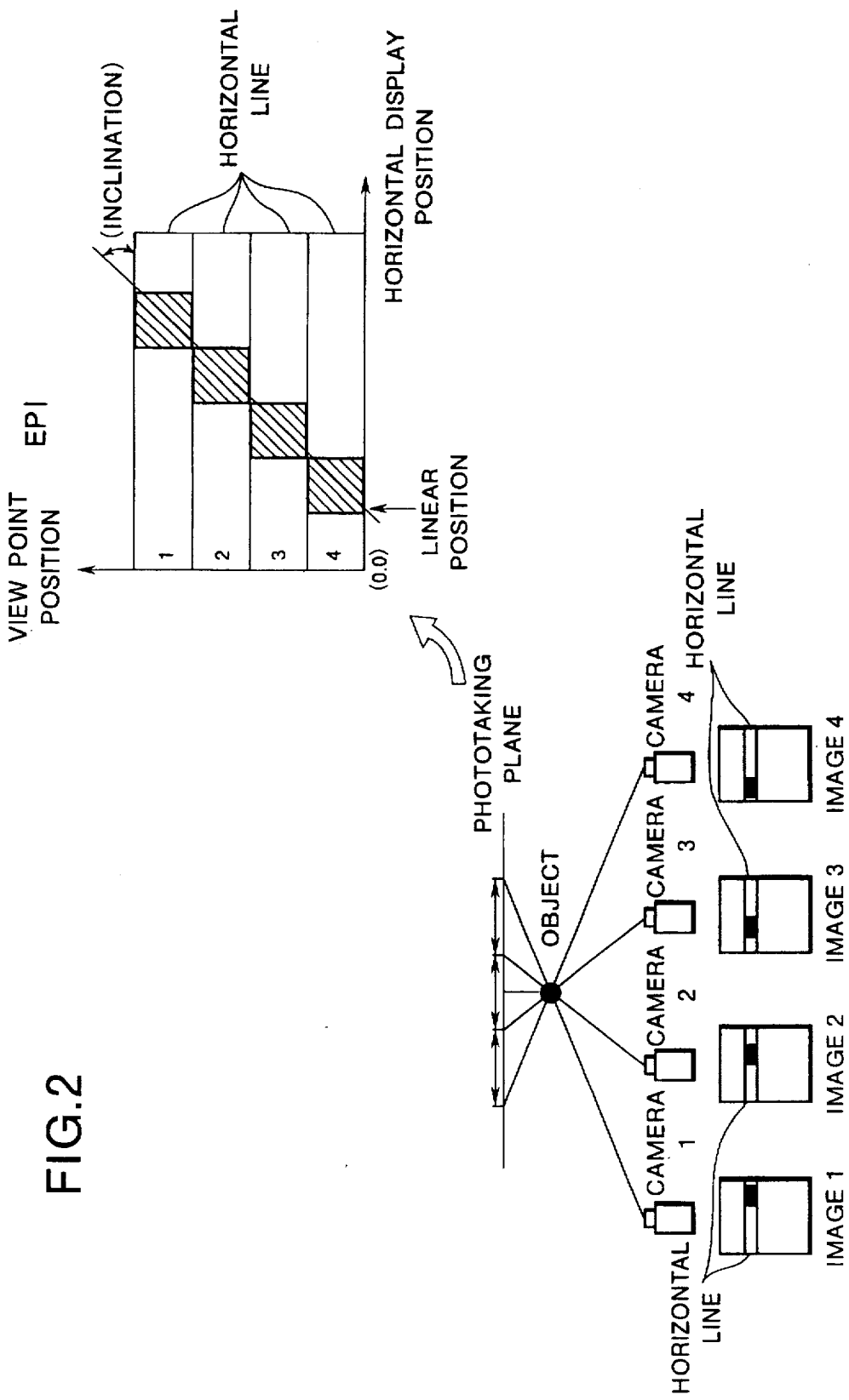
FIG. 2 is an explanatory view of an epipolar plane image, a corresponding point trace, and a trace coefficient.

The operation of the corresponding point trace discrimination portion 12 will be described in detail below with reference to FIG. 2.

The corresponding point trace discrimination portion 12 sets a certain horizontal line as a line of interest, and generates an epipolar plane image (EPI) of the line from images input from the inputted multi view points image hold portion 11 which holds multi view points images 1 to 4 phototaken by cameras at a plurality of view point positions. Note that the EPI is an image constituted by acquiring common lines from images phototaken from the respective view point and rearranging them in the order of view points, i.e., an image defined by a coordinate system in which the image horizontal display position is plotted along the abscissa and the view point position is plotted along the ordinate, as shown in FIG. 2. Since the inputted images of the inputted multi view points image hold portion 11 are those phototaken from view points linearly aligned in the right-and-left direction, the corresponding point trace of an image of a given light source point defines a straight line on the EPI.

Therefore, the corresponding point trace discrimination processing of the corresponding point trace discrimination portion 12 equals to processing for defining a straight line corresponding to the corresponding point trace on the EPI. More specifically, the trace coefficient control portion 13 sequentially assumes all considered by a trace coefficient as a set of two coefficients, i.e., the position and slope of a straight line, as shown in FIG. 2 until the evaluation amounts, e.g., the difference values such as the evaluation value of the density values among adjacent pixels of the EPI corresponding to the calculated straight line, and the sum total of the difference and the values controlled by the discrimination threshold value control portion 15 are sequentially compared. Then, the portion 13 records in the detection trace record portion 14 all the trace coefficients (the position and slope of a straight line) such that the evaluation amount becomes equal to or smaller than a predetermined threshold value and density value information (e.g., an average value of the density values of the corresponding points) of the corresponding points. The parametric data 19 outputted from the data output portion 17 corresponds to sets of the positions and slopes of straight lines, and density value information corresponding in number to the detected linear traces by each of horizontal lines.

The operation of the corresponding point trace interpolation portion 111 will be described in detail below.

The corresponding point trace interpolation portion 111 obtains the view point position in the right-and-left direction from the view point detector 115. The portion 111 calculates the display positions, in the horizontal direction, of light source points in images for all the corresponding point traces of each of horizontal lines of the parametric data 19, and draws the density values of the light source points at the calculated display positions. As a result, one image corresponding to the view point position is generated.

Let x, x0, k, and X be the display position in the horizontal direction, of a given light source point in a certain horizontal line, the position and slope of the straight line of the corresponding point trace, and the view point position, respectively. Then, the display position is calculated using equation (1) below:

$$x = x0 + k \cdot X \tag{1}$$

Note that the display screen 114 and the image display portion 113 may respectively use a stereoscopic display screen and a stereoscopic display portion of a lenticular or spectacle type, which allows a binocular stereoscopic view, the view point position input portion 112 may calculate view point parameters corresponding to the right and left eye positions, and the corresponding point trace interpolation portion 111 may generate images to be presented for the right and left eyes, thus realizing a binocular stereoscopic display device which allows view point movement in the back-and-forth and right-and-left directions.

(Second Embodiment)

An embodiment in which the present invention is applied to an image processing apparatus which allows view point movement in the back-and-forth and right-and-left directions will be described below. In this embodiment, the interpolation processing of the corresponding point trace interpolation portion 111 in the first embodiment is replaced by the processing to be described below.

Figure 3:
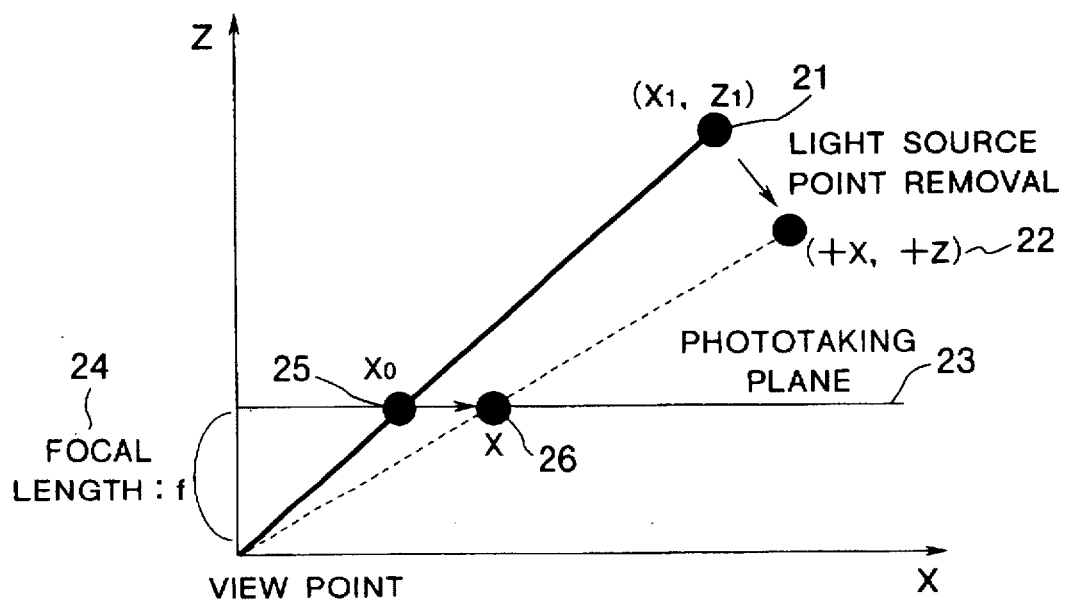
FIG. 3 is a graph showing the principle of interpolation calculations in a corresponding point trace interpolation portion 111 in an image processing apparatus according to the second embodiment of the present invention.

FIG. 3 is a graph showing the principle of interpolation calculations of the corresponding point trace interpolation portion 111 of the image processing apparatus of the second embodiment. In FIG. 3, numeral 21 indicates a given light source point, numeral 22 indicates the moving amount of the light source point, numeral 23 indicates the phototaking plane wherein the phototaking plain has a pixel pitch. Numeral 24 indicates the focal length, numeral 25 indicates an image of the light source point 21 projected onto the phototaking plane 23, numeral 26 indicates an image after movement of the image 25 when the light source point 21 moves by the moving amount 22.

The principle of processing of the corresponding point trace interpolation portion 111 of the second embodiment will be described below with reference to FIG. 3. A given light source point 21 in a space will be examined below. Assume that the image 25 is projected onto the phototaking plane 23 of a virtual camera at a visual point position (0, 0). The projected position corresponds to the straight line position x0. The movement of the image 25 upon movement of the view point position will be examined below. Movement of the view point in a given direction is equivalent to movement of the light source point 21 in the opposite direction. By utilizing this principle, x obtained when the light source point 21 moves by the moving amount 22 is calculated.

Let X1, Z1, p, and f be the right-and-left position and the depth of the light source point 21, the pixel pitch of the phototaking plane, and the focal length 24. Then, two equations (2) and (3) below hold from FIG. 2.

$$X1/Z1 = (p \cdot x0)/f \tag{2}$$

$$(X1 + X)/(Z1 + Z) = (p \cdot x)/f \tag{3}$$

Solving these two equations yields the following equation (4):

$$x = (x0 + k \cdot X)/(1 + k \cdot a \cdot Z) \tag{4}$$

Note that the straight line slope k satisfies the relation given by equation (5) below:

$$k = f/(p \cdot Z1) \tag{5}$$

On the other hand, a is a constant defined by equation (6) below:

$$a = f/p \tag{6}$$

Using equation (4), the image 26 after movement corresponding to view point movement (−X, −Z) can be obtained.

The operation of the corresponding point trace interpolation portion 111 of this embodiment will be described below.

The view point detector 115 supplies a view point position (−X, −Z) in the right-and-left and back-and-forth directions to the corresponding point trace interpolation portion 111. The corresponding point trace interpolation portion 111 calculates equation (4) for all the corresponding point traces in horizontal lines of the parametric data 19, thus generating an image corresponding to view point movement in the right-and-left and back-and-forth directions.

In this embodiment, since inputted images have no parallax in the up-and-down direction, a distortion is generated in the up-and-down direction in an image generated in correspondence with view point movement in the back-and-forth direction. When the image is displayed, the distortion can be corrected to a negligible level by performing enlargement/reduction conversion in the up-and-down direction in correspondence with the distance to an object.

(Third Embodiment)

An embodiment for executing the processing of the second embodiment at high speed will be described below. In this embodiment, the interpolation processing of the corresponding point trace interpolation portion 111 in the second embodiment is replaced by the processing to be described below.

Figure 4:
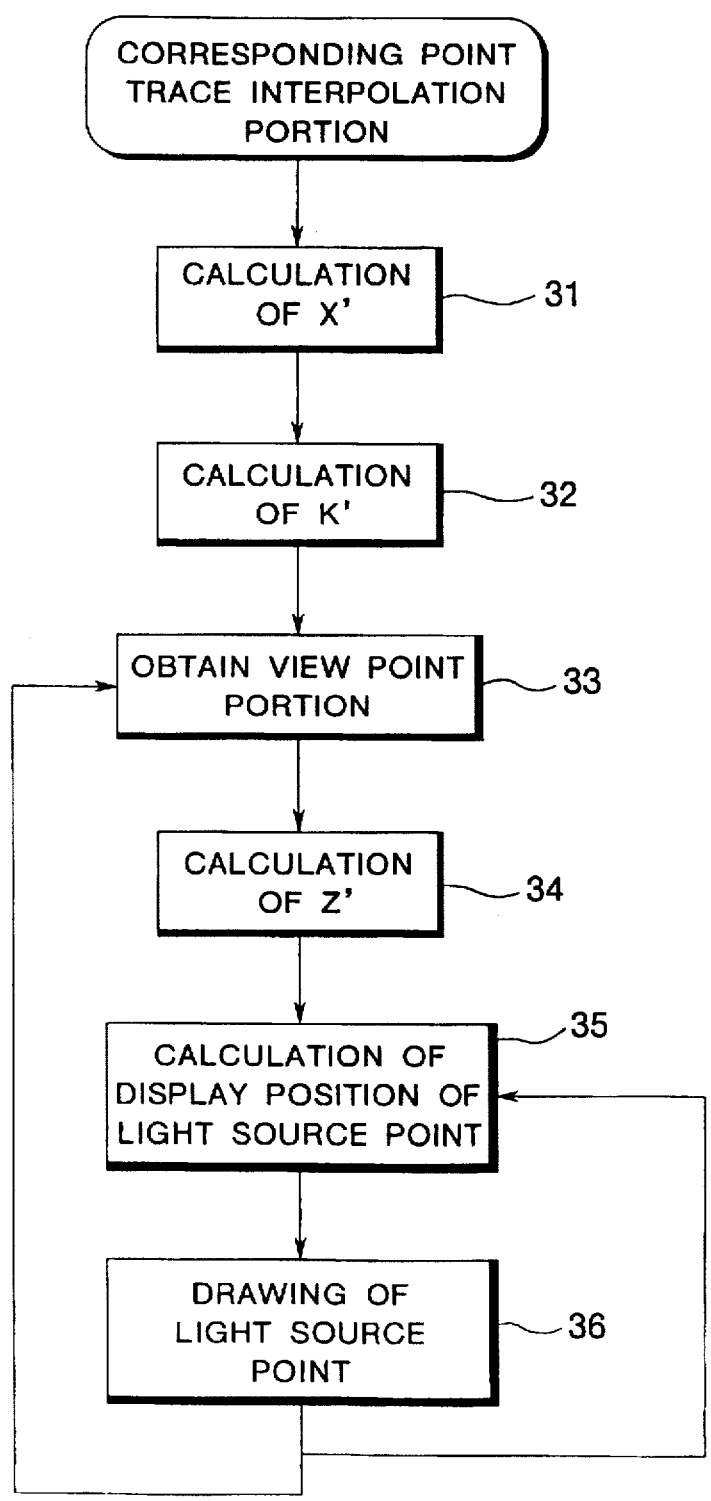
FIG. 4 is a flow chart showing the high-speed calculation processing of a corresponding point trace interpolation portion 111 in an image processing apparatus according to the third embodiment of the present invention.

FIG. 4 is a flow chart showing the high-speed calculation processing of the corresponding point trace interpolation portion 111 of the image processing apparatus of the third embodiment.

First, the principle of interpolation processing of the corresponding point trace interpolation portion 111 of this embodiment will be explained.

Equation (4) can be modified to equation (7) below:

$$x = ((x0/k) + X)/((1/k) + (a \cdot Z)) \tag{7}$$

When x', k', and Z' are defined as equations (8), (9), and (10) below, equation (7) further reduces to equation (11).

$$x' = x0/k \tag{8}$$

$$k' = 1/k \tag{9}$$

$$Z' = a \cdot Z \tag{10}$$

$$x = (x' + X)/(k' + Z') \tag{11}$$

Note that x' and k' can be calculated in advance since they are independent from the view point position. On the other hand, Z' need only be calculated once per change in view point position since it is independent from the corresponding point trace.

The operation of the interpolation processing of the corresponding point trace interpolation portion 111 of this embodiment will be described below.

The corresponding point trace interpolation portion 111 calculates x' and k' for all the corresponding point trace coefficients by using equations (8) and (9) in steps 31 and 32. The portion 111 obtains the view point position from the view point position input portion 112 in step 33, and calculates Z' using equation (10) once per change in view point position in step 34. The portion 111 calculates the display positions of light source points using equation (11) for all the corresponding point trace coefficients of horizontal lines in step 35. In step 36, the portion 111 draws the density values of the light source points.

With the above-mentioned processing, this embodiment can execute the corresponding point trace interpolation processing at high speed, and an effect unique to this embodiment, i.e., smoother view point movement, is produced.

(Fourth Embodiment)

An embodiment in which the present invention is applied to an image processing apparatus which allows view point movement in the back-and-forth, up-and-down, and right-and-left directions will be described below. In this embodiment, the detection processing of the corresponding point trace detection portion 18 and the interpolation processing of the on-demand interpolation display portion 116 in the third embodiment are replaced by processing to be described below.

The operation of the corresponding point trace detection portion 18 will be described below. In this embodiment, inputted images of the inputted multi view points image hold portion 11 are images phototaken from view points aligned on a plane in the right-and-left and up-and-down directions. For this reason, the trace of an image of a given light source point defines a plane in a four-dimensional image space constituted by multi view points images in the inputted multi view points image hold portion 11, i.e., a display coordinate system (x, y) and a view point coordinate system (X, Y). Therefore, the corresponding point trace discrimination processing of the corresponding point trace discrimination portion 12 is equal to plane discrimination processing in this inputted four-dimensional image space. This plane is expressed by equation (12) below:

$$(x, y)=(x0+k \cdot X, y0+k \cdot Y) \quad (12)$$

Note that the position of the view point, the position of a light source point on the trace, and the position and slope of the trace are respectively (X, Y), (x, y), (x0, y0), and k.

The trace coefficient calculated by the trace coefficient control portion 13 corresponds to a set of three coefficients (x0, y0, k) indicating the position and slope of a plane. The corresponding point trace discrimination portion 12 discriminates a planar trace in the image space under the control of the trace coefficient control portion 13 and the discrimination threshold value control portion 15 in turn, and records the coefficient of the detected plane in the detection trace record portion 14. The parametric data 19 outputted from the data output portion 17 corresponds to a set of coefficients corresponding in number to the detected planar traces.

The processing of the on-demand interpolation display portion 116 of this embodiment will be described below.

In step 31, the corresponding point trace interpolation portion 111 calculates equation (13) below in addition to equation (8):

$$y'=y0/k \quad (13)$$

In step 35, the display positions (x, y) of light source points are calculated using equation (14) below:

$$(x, y)=(1/(k'+Z'))\cdot(x'+X, y'+Y) \quad (14)$$

In step 36, the density values of the light source points are drawn in correspondence with the display positions.

In this embodiment, since inputted images have a parallax in the up-and-down direction, an effect unique to this embodiment is expected: any distortion in the up-and-down direction in such as the second and third embodiments is not generated.

(Other Embodiments)

In each of the above embodiments, multi view points images phototaken in advance are held in the inputted multi view points image hold portion 11. When the portion 11 is replaced by a multi eye television camera which can fetch multi view points images in real time, a real-time arbitrary view point image phototaking display system can be realized.

Furthermore, when the parametric data 19 is exchanged as communication data between remote terminals, a real-time arbitrary view point image communication system can be realized.

Note that the present invention may be applied to a stand-alone image processing apparatus, a system such as a multi view points video telephone terminal, a multi view points television meeting system, or the like, or a hybrid apparatus combined with a computer, other image processing apparatuses, and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image data processing apparatus for generating an image corresponding to a view point comprising:

multi view points image data holding means for holding a plurality of images obtained by phototaking an object from a plurality of view points arranged in a left and right direction;

corresponding point trace detection means for sequentially detecting a coefficient representing a relationship between view point positions and displaying positions of corresponding points being mutually corresponded among said multi view points image data;

wherein the coefficient is used when images of view points different from the view points when said object is phototaken are reproduced; and means for outputting the coefficient of each of a plurality of the corresponding point traces present in the multi view points image data.

2. An apparatus according to claim 1, wherein said corresponding point trace detection means comprises means for detecting a coefficient which defines a straight line as the corresponding point trace on an epipolar plane image of the multi view points image data.

3. An apparatus according to claim 1, wherein said corresponding point trace detection means comprises means for detecting a coefficient which defines a plane as the mutually corresponding point trace among the multi view points image data.

4. An image reproduction apparatus for reproducing an image in correspondence with a view point, comprising:

coefficient input means for inputting a coefficient representing a relationship between view point positions and a displaying positions of corresponding points being mutually corresponded among a plurality of images obtained by phototaking an object from a plurality of view points arranged in a left or right direction;

means for inputting a view point position including a view point position different from the view point positions of said plurality of image data;

image interpolation generation means for generating an image corresponding to the inputted view point position by interpolation on the basis of the coefficient; and means for outputting the generated image to a display device.

5. An apparatus according to claim 4, wherein the coefficient is a coefficient which defines a straight line as the corresponding point trace on an epipolar plane image of the multi view points image data.

6. An apparatus according to claim 4, wherein the coefficient is a coefficient which defines a plane as the corresponding point trace of the multi view points image data.

7. An apparatus according to claim 4, further comprising view point position detection means for detecting a position of an eye of an observer who observes the display device, and wherein the view point position from said view point position detection means is inputted to said view point position input means.

8. An apparatus according to claim 4, further comprising distortion correction means for correcting a distortion of the image generated by said image interpolation generation means.

9. An apparatus according to claim 4, wherein the display device comprises a stereoscopic display.

10. An apparatus according to claim 4, wherein the display device comprises a lenticular display.

* * * * *